(12) United States Patent
Lee et al.

(10) Patent No.: US 9,933,865 B2
(45) Date of Patent: Apr. 3, 2018

(54) NAVIGATION DEVICE WITH ADJUSTABLE SAMPLE PERIOD

(71) Applicant: PIXART IMAGING (PENANG) SDN. BHD., Penang (MY)

(72) Inventors: Joon-Chok Lee, Penang (MY); Kevin Len-Li Lim, Penang (MY)

(73) Assignee: PIXART IMAGING INC., Hsin-Chu County (TW)

(*) Notice: Subject to any disclaimer, the term of this patent is extended or adjusted under 35 U.S.C. 154(b) by 56 days.

(21) Appl. No.: 14/464,836

(22) Filed: Aug. 21, 2014

(65) Prior Publication Data

US 2016/0054816 A1    Feb. 25, 2016

(51) Int. Cl.
*G06F 3/0354* (2013.01)
*G01B 11/14* (2006.01)
*G06F 3/03* (2006.01)

(52) U.S. Cl.
CPC .......... *G06F 3/03543* (2013.01); *G01B 11/14* (2013.01); *G06F 3/0304* (2013.01)

(58) Field of Classification Search
None
See application file for complete search history.

(56) References Cited

U.S. PATENT DOCUMENTS

| | | | |
|---|---|---|---|
| 6,455,840 B1* | 9/2002 | Oliver | H04N 1/047 250/222.1 |
| 2005/0190158 A1* | 9/2005 | Casebolt | G06F 3/0317 345/166 |
| 2007/0002021 A1* | 1/2007 | Lin | G06F 3/0317 345/166 |
| 2009/0195505 A1* | 8/2009 | Chen | G06F 1/3203 345/166 |

* cited by examiner

*Primary Examiner* — Jennifer Mehmood
*Assistant Examiner* — Krishna Neupane
(74) *Attorney, Agent, or Firm* — Hauptman Ham, LLP

(57) ABSTRACT

There is provided a navigation device including an image sensor and a processing unit. The image sensor is configured to capture reflected light of a work surface with a low-speed period to generate image frames, wherein the image sensor captures a pair of image frames in each low-speed period. The processing unit is configured to calculate acceleration according to the pair of image frames to accordingly identify whether to adjust the low-speed period to a high-speed period.

20 Claims, 6 Drawing Sheets

NAVIGATION DEVICE WITH ADJUSTABLE SAMPLE PERIOD

BACKGROUND

1. Field of the Disclosure

This disclosure generally relates to an input device and, more particularly, to a navigation device with an adjustable sample period.

2. Description of the Related Art

The optical mouse generally calculates the displacement according to the correlation between two image frames. However, high operation resources are required to perform the calculation on the whole image frame and thus it is possible to perform the calculation on only a part of the image frame.

For example referring to FIG. 1A, it is a schematic diagram of two consecutive image frames F1 and F2 captured by a camera. A 5×5 correlation search window SW, assuming at the center of the image frame F1, for calculating the displacement between the image frames F1 and F2 is computed by shifting the comparison image frame F2 around the reference image frame F1. For example, in calculating the element "13" of the correlation search window SW, the comparison image frame F2 is fully overlapped with the reference image frame F1 as shown in FIG. 1B such that 13×13 pixels of the two image frames F1 and F2 are all used to calculate the correlation. For example, in calculating the element "8" of the correlation search window SW, the comparison image frame F2 is overlapped with the reference image frame F1 by 1-pixel shifting upward as shown in FIG. 1C such that only 12×13 overlapped pixels of two the image frames F1 and F2 are used to calculate the correlation. For example, in calculating the element "1" of the correlation search window SW, the comparison image frame F2 is overlapped with the reference image frame F1 by 2-pixels shifting upward and leftward as shown in FIG. 1D such that only 11×11 overlapped pixels of the two image frames F1 and F2 are used to calculate the correlation. Other elements "2" to "7", "9" to "12" and "14" to "25" in the correlation search window SW are calculated through similar processes.

Referring to FIG. 1A again, under the condition of limiting the displacement between two image frames within two pixel distances and assuming that the size of each pixel is 30 micrometers, an initial velocity (e.g. the velocity at time $t_1$) is 5 inches/second and the acceleration requirement is 50 g, the sample period $\Delta t$ is calculated to be smaller than 0.2994 ms by using the equation of uniformly accelerated motion, i.e. the frame rate is larger than 3,340 frames/second, if correct displacement is to be obtained, wherein "g" is the acceleration of gravity.

However, inventors notes that although the displacement is detected correctly by increasing the frame rate, the data quantity to be processed per second is also increased thereby degrading the power saving effect.

SUMMARY

Accordingly, the present disclosure further provides a navigation device that adaptively adjusts the sample period according to the acceleration such that in a low-speed mode image frames are captured with a longer sample period thereby reducing the power consumption.

The present disclosure provides a navigation device that captures a pair of image frames within each sample period of a low-speed mode for calculating acceleration and identifies whether to adjust to a high-speed mode according to the calculated acceleration.

The present disclosure provides a navigation device that captures a pair of image frames within each sample period of a low-speed mode for calculating acceleration and calculates report displacement according to first image frames of the pair of image frames captured in two successive low-speed periods.

The present disclosure provides a navigation device adapted to be operated on a work surface including an image sensor and a processing unit. The image sensor is configured to capture reflected light of the work surface with a low-speed period to generate image frames, wherein the image sensor captures only a pair of image frames within each low-speed period so as to reduce the power consumption. The processing unit is configured to calculate acceleration according to the pair of image frames of the low-speed period to accordingly identify whether to adjust the low-speed period to a high-speed period.

The present disclosure further provides a navigation device adapted to be operated on a work surface including an image sensor and a processing unit. The image sensor is configured to capture reflected light of the work surface with a low-speed period or at least one high-speed period to generate image frames, wherein the image sensor captures a first image frame and a second image frame within each low-speed period. The processing unit is configured to calculate a velocity according to the first image frame and the second image frame of a same low-speed period, calculate acceleration according to the velocity of two successive low-speed periods and calculate report displacement according to the first image frames of different low-speed periods.

The present disclosure further provides a navigation device adapted to be operated on a work surface including an image sensor and a processing unit. The image sensor is configured to capture reflected light of the work surface to generate image frames. The processing unit is configured to calculate acceleration according to a first pair of image frames separated by a time interval and a previous pair of image frames captured by the image sensor, wherein when the acceleration exceeds a threshold, the processing unit is configured to control the image sensor to capture another image frame after the time interval, and when the acceleration is smaller than the threshold, the processing unit is configured to control the image sensor to capture a second pair of image frames separated by the time interval after a pause time. As the image frame is not captured within the pause time, the power consumption is reduced.

In some embodiments, a time interval between the pair of image frames captured within the low-speed period is negatively correlated with a value of the report displacement, and the pair of image frames is successively captured at an initial of the low-speed period.

In some embodiments, the high-speed period is negatively correlated with a value of the acceleration and is adaptively adjustable.

In some embodiments, the low-speed period and the high-speed period are served as report periods.

In some embodiments, the processing unit is configured to extrapolate report displacement of a low-speed period previous to the high-speed period based on displacement calculated according to first two image frames captured in the high-speed period. Accordingly, the first image frame of a previous low-speed period previous to the high-speed period is not used to calculate the report displacement of the previous low-speed period so as to avoid errors.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
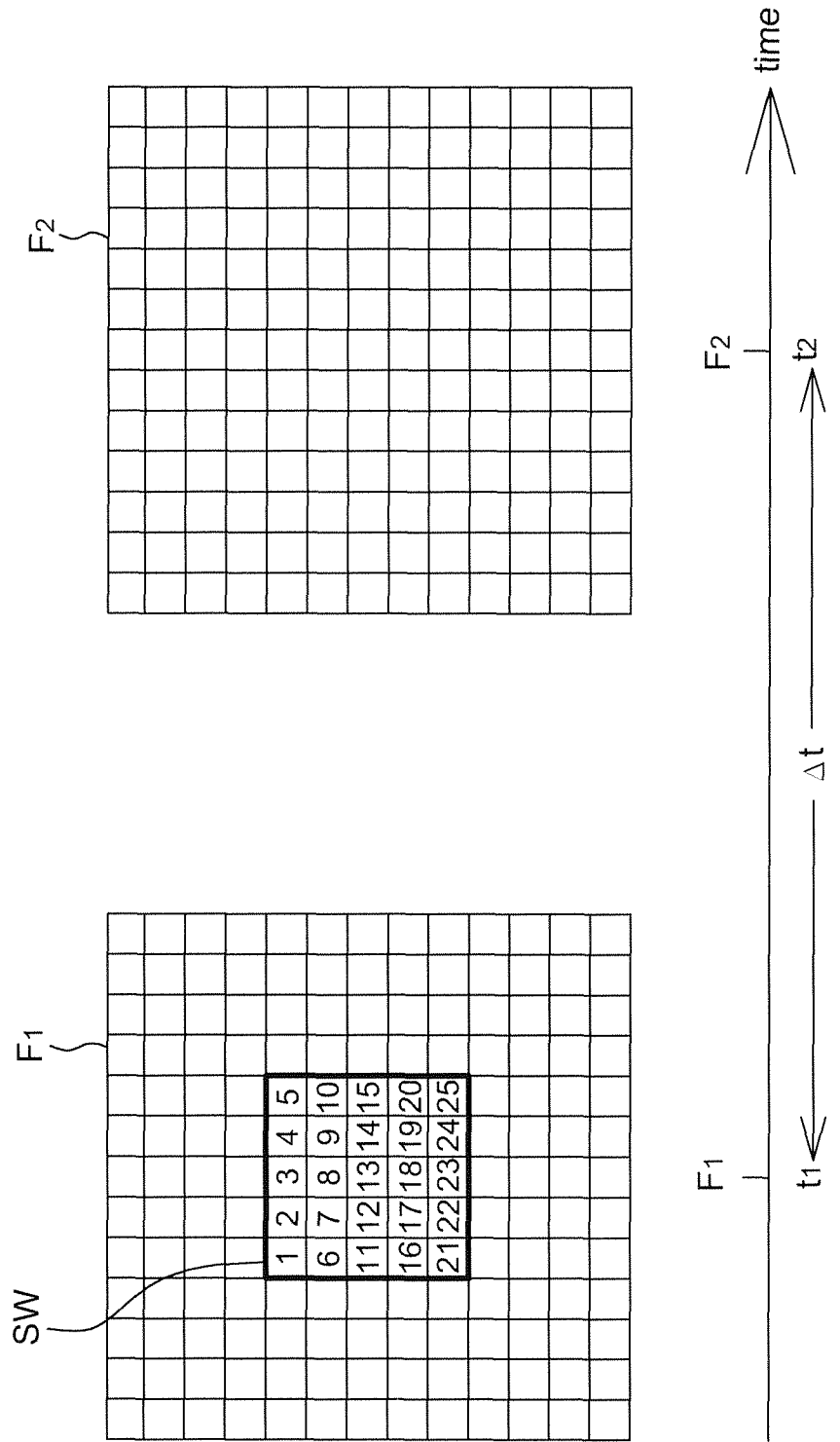
FIG. 1A is a schematic diagram of two image frames captured by the optical mouse.
Figure 1B:
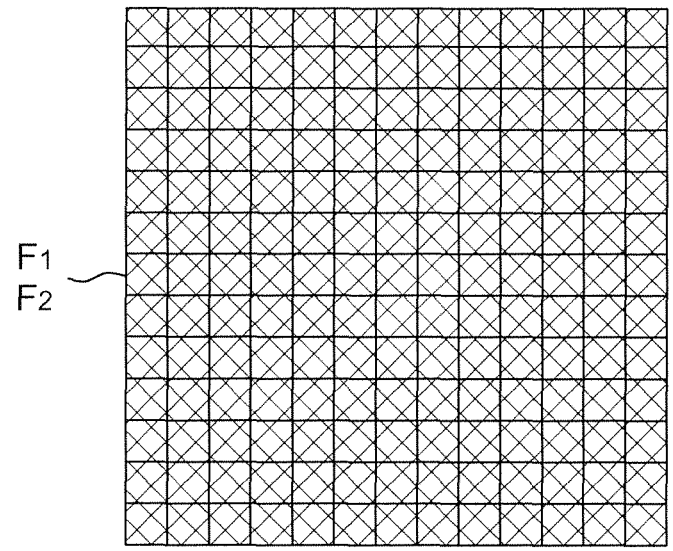
FIGS. 1B-1D are schematic diagrams of calculating elements of the correlation search window.
Figure 1C:
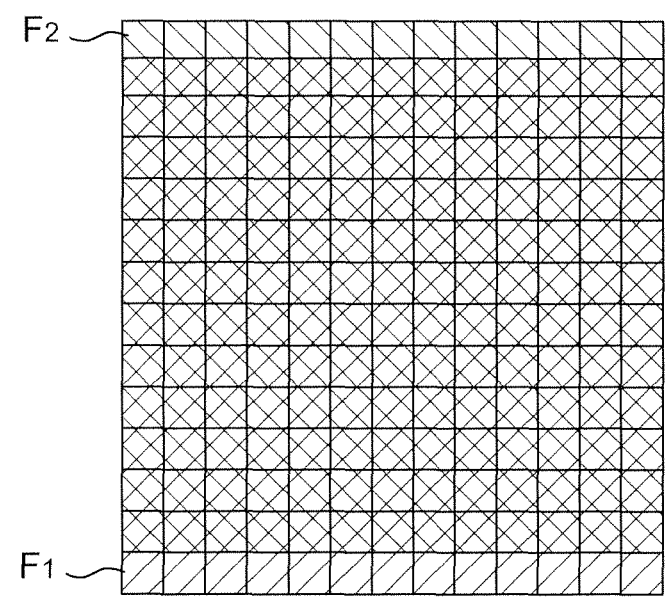
Figure 1D:
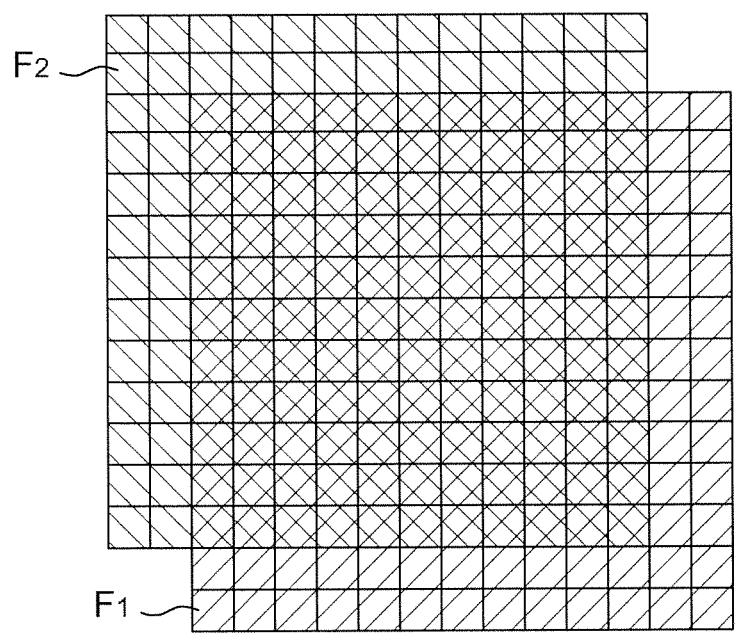
Figure 2A:
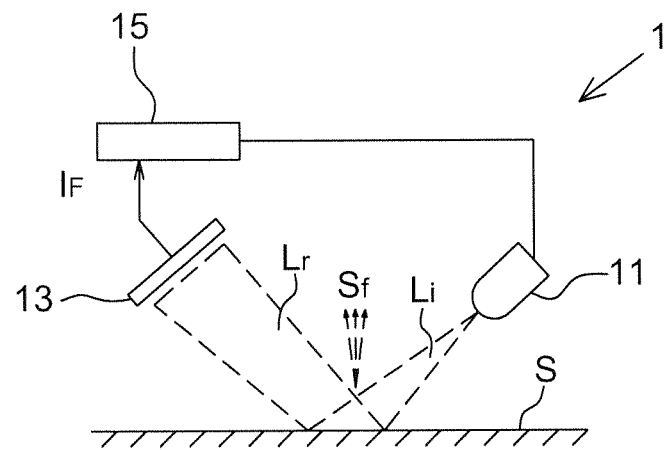
FIGS. 2A and 2B are schematic diagrams of different arrangements of the navigation device according to one embodiment of the present disclosure.
Figure 2B:
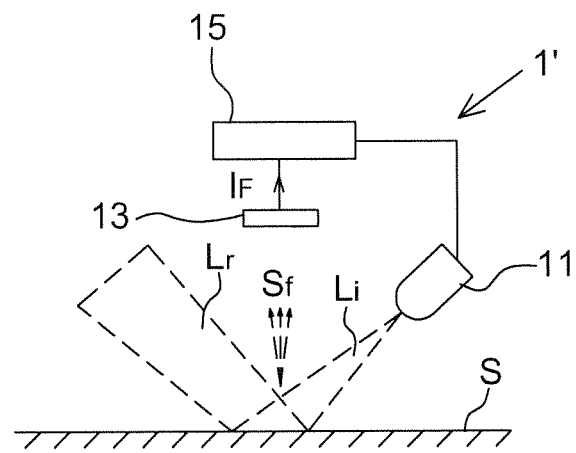

Referring to FIGS. 2A-2B, they are schematic diagrams of the navigation device according to one embodiment of the present disclosure configured to be operated on a work surface S. The navigation device 1 includes a light source 11, an image sensor 13 and a processing unit 15, wherein the light source 11 is configured to emit an incident light beam Li toward the work surface S and the incident light beam Li is reflected by the work surface S to generate a main reflected light beam Lr and a scattered light field Sf, wherein the incident light beam Li and the main reflected light beam Lr are symmetric with respect to a normal direction of the work surface S. If the light intensity of the incident light beam Li is maintained unchanged, when the work surface S is smoother, the main reflected light beam Lr is stronger and the scattered light field Sf is weaker; on the contrary, when the work surface S is rougher, the main reflected light beam Lr is weaker and the scattered light field Sf is stronger.

If the image sensor 13 is arranged within a range of the main reflected light beam Lr, a bright field arrangement is formed as shown in FIG. 2A. If the image sensor 13 is arranged within the range of the scattered light field Sf, a dark field arrangement is formed as shown in FIG. 2B. The image sensor 13 may be arranged as bright or dark field arrangement without particular limitation. It is appreciated that the arrangement of the main reflected light beam Lr, the scattered light field Sf and the image sensor 13 shown in FIGS. 2A and 2B is only intended to illustrate but not to limit the present disclosure.

The light source 11 may be a light emitting diode, a laser diode or other active light sources, and configured to emit light of an identifiable spectrum to illuminate the work surface S, such as a table surface. In some embodiments, the navigation device 1 further includes at least one light guide (e.g. lens) configured to improve the illumination efficiency and/or to adjust the illumination range, and the light guide is arranged according to the applications without particular limitation. In addition, when the intensity of ambient light is strong enough, the light source 11 may not be implemented.

The image sensor 13 may be a CCD (charge-coupled device) image sensor, a CMOS (complementary metal oxide semiconductor) sensor or other sensing devices adapted to detect optical energy and generate images. The image sensor 13 is configured to capture reflected light from the work surface S to generate image frames $I_F$ that is transmitted to the processing unit 15. In some embodiments, the image sensor 13 is controlled by the processing unit 15 to capture the image frames $I_F$ with a low-speed mode or a high-speed mode, wherein the low-speed mode is referred to capturing reflected light of the work surface S in each low-speed period to generate a pair of image frames, and the high-speed mode is referred to capturing reflected light of the work surface S in each high-speed period to generate an image frame (described later). More specifically speaking, a sample period of the low-speed mode is longer than a sample period of the high-speed mode.

The processing unit 15 is a digital signal processor, a microcontroller, a single chip or other processing devices capable of processing images. The processing unit 15 is coupled to the light source 11 and the image sensor 13 configured to post-process the image frames $I_F$ captured by the image sensor 13 and to control the image sensor 13 as well as the light source 11, e.g. controlling the light source 11 to emit light corresponding to the image capturing of the image sensor 13. In addition, the processing unit 15 is further configured to report displacement information (or velocity information) to an outside device. For example, if the navigation device 1 is an optical mouse, the processing unit 15 reports displacement information to a host configured to relatively control a cursor motion, but not limited thereto. In some embodiments, the report period of the processing unit 15 is set equal to the low-speed period or the high-speed period of the image sensor 13 in capturing image frames $I_F$. For example, when the image sensor 13 captures image frames $I_F$ with the low-speed mode, the processing unit 15 reports the displacement information by the low-speed period; whereas when the image sensor 13 captures image frames $I_F$ with the high-speed mode, the processing unit 15 reports the displacement information by the high-speed period.

Figure 3:
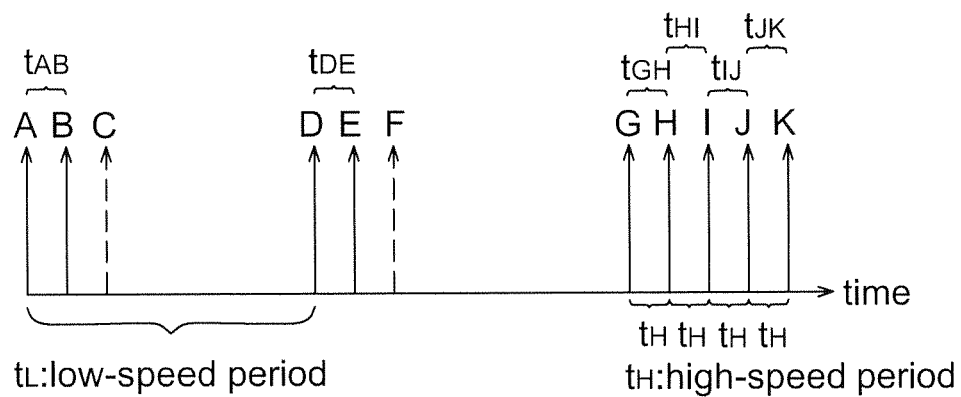
FIG. 3 is a schematic diagram of the operation of the navigation device according to one embodiment of the present disclosure.

Referring to FIG. 3, it is an operational schematic diagram of the navigation device according to one embodiment of the present disclosure, wherein solid arrows indicate the captured image frames (e.g. A, B, D, E, G-K) and dashed arrows indicate non-captured image frames (e.g. C, F). In the low-speed mode, the image sensor 13 captures image frames by a low-speed period $t_L$, e.g. only capturing a pair of image frames (e.g. AB, DE) within each low-speed period $t_L$, wherein it is assumed that a first of the pair of image frames is a first image frame (e.g. A, D) and a second of the pair of image frames is a second image frame (e.g. B, E). The processing unit 15 is configured to calculate a first velocity according to the first image frame A and the second image frame B (e.g. according to the displacement between AB and the time interval $t_{AB}$) captured in the same low-speed period, calculate a second velocity according to the first image frame D and the second image frame E (e.g. according to the displacement between DE and the time interval $t_{DE}$) captured in the same low-speed period, and calculate acceleration according to the first velocity and second velocity using the equation of uniformly accelerated motion (i.e. a velocity change between the first velocity and the second velocity). The processing unit 15 is also configured to calculate report displacement according to the first image frames A and D captured in different low-speed periods (e.g. adjacent two low-speed periods), wherein the processing unit 15 is further configured to identify whether to enter the high-speed mode according to the acceleration thereby adjusting the low-speed period to a high-speed period. In other words, in some embodiments the second of the pair of image frames of the low-speed period (e.g. B, E) is used to calculate the acceleration but not to calculate the report displacement, wherein said report displacement is referred to the displacement information that the processing unit 15 reports to the external device. In addition, as the time interval (e.g. $t_{AB}$, $t_{DE}$) between capturing the pair of image frames is known, in some embodiments the report displacement is further calculated as velocity information (i.e. displacement divided by the time interval).

As the low-speed period reduces the system resources used on calculating the displacement thereby reducing the power consumption, in some embodiments only a pair of image frames (e.g. AB, DE) is captured within each low-speed period $t_L$ and the pair of image frames is sequentially captured at an initial of the low-speed period as shown in FIG. 3 as an example. In other embodiments, even though more than two image frames are captured within one low-speed period, the processing unit 15 only post-processes two (e.g. the first two) image frames but ignores others. More specifically, at least one image frame is included in each low-speed period for calculating acceleration but not for calculating the report displacement. Furthermore, a time interval between capturing the pair of image frames is set fixed or negatively correlated with the report displacement. For example, in FIG. 3 the time interval $t_{DE}$ is fixed or correlated with the displacement (or velocity) obtained according to the first image frames A and D. When the displacement is larger, the time interval $t_{DE}$ is shorter, whereas when the displacement is smaller, the time interval $t_{DE}$ is longer.

When the acceleration exceeds a threshold, the processing unit 15 adjusts the low-speed period to the high-speed period. In some embodiments, the high-speed period is a predetermined fixed value. In other embodiments, the high-speed period is negatively correlated with the acceleration, e.g. the high-speed period $t_{GH}$, $t_{HI}$, $t_{IJ}$ and $t_{JK}$ in FIG. 3 may not be all the same. For example, when a value of the acceleration is larger, the high-speed period is shorter, whereas when a value of the acceleration is smaller, the high-speed period is longer in order to obtain correct detection. In other embodiments, the navigation device 1 stores a plurality of thresholds, and the processing unit 15 is configured to select a high-speed period therefrom according to a comparison result of comparing the acceleration and the thresholds, and the selected high-speed period is also negatively correlated with a value of the acceleration.

In calculating the acceleration, as the time interval $t_{AB}$ is known and the displacement $D_{AB}$ between image frames AB is also obtainable according to the image frames A and B (e.g. using correlation), an velocity $V_{AB}$ is obtainable; and as the time interval $t_{DE}$ is known and the displacement $D_{DE}$ between image frames DE is also obtainable according to the image frames D and E (e.g. using correlation), an velocity $V_{DE}$ is obtainable. Then acceleration $a_E$ at image frame E is obtainable according to the velocity $V_{AB}$, the velocity $V_{DE}$ and the time interval $t_{BE}$ using the equation of uniformly accelerated motion In other words, the acceleration in the low-speed period is calculated according to the velocity variation between two consecutive pairs of image frames. It should be mentioned that the displacement $D_{AB}$ and $D_{DE}$ are not served as the report displacement.

In the present disclosure, whether to enter the high-speed period from the low-speed period is determined according to the acceleration (e.g. $a_E$) but not according to the velocity (e.g. $V_{AB}$, $V_{DE}$). For example in one embodiment, when the velocity is high but the acceleration is smaller than an acceleration threshold (e.g. $a_E$=0), the high-speed period is not entered. In another embodiment, when the velocity is low but the acceleration exceeds the acceleration threshold (e.g. $V_{DE}$ much larger than $V_{AB}$), the high-speed period is entered.

Also assuming the size of every pixel is 30 micrometers, an initial velocity (e.g. the velocity $V_B$ at time $t_B$) is 5 inches/second, the acceleration requirement is a=50 g, the time interval $t_{AB}$, $t_{DE}$ is 100 microseconds and a search area of the search block (e.g. the displacement $D_{DE}$ between image frames D and E herein) is not more than two pixels, the low-speed period $t_L=t_{AD}$ is obtainable by using the equation of uniformly accelerated motion $D_{DE}=[a\times(t_{AD}-t_{AB})+V_B]\times t_{DE}+\frac{1}{2}\times a\times t_{DE}^2$. Herein, the detection requirement is full-filled if the low-speed period $t_L$ is smaller than 1.014 ms, i.e. the frame rate being larger than about 986 frames per second. Compared to the conventional detection requirement, the frame rate is obviously reduced to about ⅓.

In other words, the processing unit 15 is configured to calculate acceleration according to a first pair of image frames separated by a time interval and its previous pair of image frames captured by the image sensor 13, and then compare the acceleration with an acceleration threshold. When the acceleration exceeds the acceleration threshold, the processing unit 15 is configured to control the image sensor 13 to capture another image frame with the same time interval (i.e. the high-speed period $t_H$), whereas when the acceleration is smaller than the acceleration threshold, the processing unit 15 is configured to control the image sensor 13 to capture a second pair of image frames separated by the same time interval after a pause time, and calculate next acceleration according to the first pair of image frames and the second pair of image frames. As mentioned above, the time interval may not to be kept identical.

Referring to FIG. 3, for example the processing unit 15 calculates acceleration according to a first pair of image frames G and H captured by the image sensor 13 and separated by a time interval $t_{GH}$ and a previous pair of image frames D and E. When the acceleration exceeds a threshold, the high-speed mode is entered and the processing unit 15 controls the image sensor 13 to capture another image frame I after a same time interval $t_{HI}$. Meanwhile, the processing unit 15 further calculates displacement according to the first pair of image frames G and H and report the displacement. Then, the processing unit 15 further calculates report displacement according to the image frame I and a second of the first pair of image frames H and calculate acceleration according to the image frame I and the first pair of image frames G and H. More specifically, in the high-speed mode, the processing unit 15 calculates report displacement according to adjacent two image frames (e.g. GH, HI, IJ, JK) and calculates acceleration according to two adjacent pairs of image frames, wherein the report displacement is used to report to the external device and the acceleration is used to be compared with a threshold thereby determining whether to return to the low-speed mode and decrease the frame rate.

In another embodiment, in the high-speed period, the image frame for calculating the displacement (e.g. the reference image frame) may not be updated according to the obtained displacement. For example, the processing unit 15 calculates and reports a displacement $D_{GH}$ according to the image frames G and H. When the displacement is smaller than a predetermined threshold, the processing unit 15 then calculates a displacement $D_{GI}$ according to the image frames G and I, and reports a difference between the displacement $D_{GI}$ and the displacement $D_{GH}$ (i.e. $D_{HI}$). When the displacement $D_{GI}$ is still smaller than the predetermined threshold, the processing unit 15 then calculates a displacement $D_{GJ}$ according to the image frames G and J, and reports a difference between the displacement $D_{GJ}$ the displacement $D_{GI}$ (i.e. DO. When the displacement $D_{GJ}$ exceeds the predetermined threshold, the processing unit 15 then updates the reference image frame to I, and calculates and reports a displacement $D_{IJ}$ according to the image frames I and J.

Referring to FIG. 3 again, for example the processing unit 15 calculates acceleration according to a first pair of image frames A and B captured by the image sensor 13 and separated by a time interval $t_{AB}$ and its previous pair of image frames. When the acceleration is smaller than a threshold, the low-speed mode is kept and the processing unit 15 controls the image sensor 13 to capture a second pair of image frames DE with a same time interval $t_{DE}$ after a pause time (e.g. $t_{BD}$), wherein within said pause time $t_{BD}$ the image sensor 13 does not capture any image frame. Next, the processing unit 15 calculates report displacement according to a first of the first pair of image frames (e.g. A) and a first of the second pair of image frames (e.g. D) and reports the calculated displacement. As mentioned above, in some embodiments the time interval $t_{DE}$ is negatively correlated with a value of the reported displacement (or velocity). Similarly, the processing unit 15 also calculates acceleration according to the image frames D and E and the image frames A and B and identifies whether to maintain in the low-speed mode or transfer to the high-speed mode accordingly. It is known from FIG. 3 that as the low-speed period $t_L$ is longer than the high-speed period $t_H$ (e.g. $t_L > 10 \times t_H$ in a case of $t_L$ is around 1 ms and $t_H$ is around 100 us) such that a better power saving effect is achievable.

Figure 4:
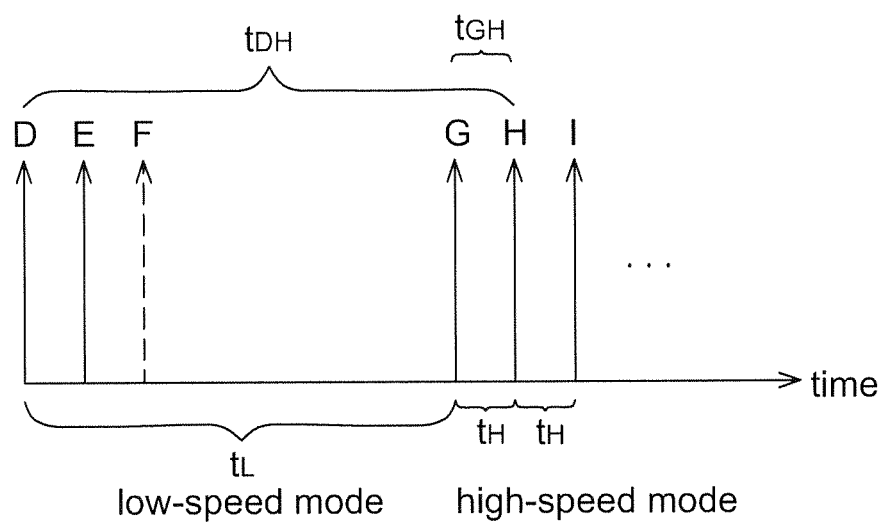
FIG. 4 is another schematic diagram of the operation of the navigation device according to one embodiment of the present disclosure.

Referring to FIG. 4, for illustration purpose FIG. 4 only shows a part of FIG. 3, wherein the processing unit 15 identifies to still operate in the low-speed mode based on the acceleration calculated according to the pair of image frames D and E and a previous pair of image frames but identifies to enter the high-speed mode based on the acceleration calculated according to the pair of image frames G and H and the pair of image frames D and E. As transferring to the high-speed mode means that the displacement calculated according to the image frames captured by the low-speed mode is possibly wrong, in some embodiments the processing unit 15 extrapolates report displacement of a previous low-speed period, e.g. $D_{DG}$, previous to the high-speed period, e.g. $t_{GH}$, according to the displacement $D_{GH}$ calculated according to first two image frames G and H captured in the high-speed mode. As the time intervals $t_{GH}$, $t_{DG}$, $t_{DH}$ are known, when the displacement $D_{GH}$ is obtained, the displacement of the time interval $t_{DG}$ or $t_{DH}$ is derivable using the time ratio, e.g. $D_{DH} = D_{GH} \times t_{DH}/t_{GH}$, $D_{DG} = D_{GH} \times t_{DG}/t_{GH}$, under assuming constant speed motion (although actually may not be the case). In other words, when the processing unit 15 identifies to transfer to the high-speed mode based on the acceleration calculated according to the image frames G and H and the image frames D and E, the report displacement $D_{DG}$ of the previous low-speed period is not calculated using the first image frame D of the previous low-speed period but extrapolated by the displacement $D_{GH}$ calculated according to the first two image frames of the high-speed mode. In some embodiments, even though the processing unit 15 calculates the displacement $D_{DG}$ according to the image frames D and G, the calculated displacement $D_{DG}$ is not served as the report displacement and ignored.

Figure 5:
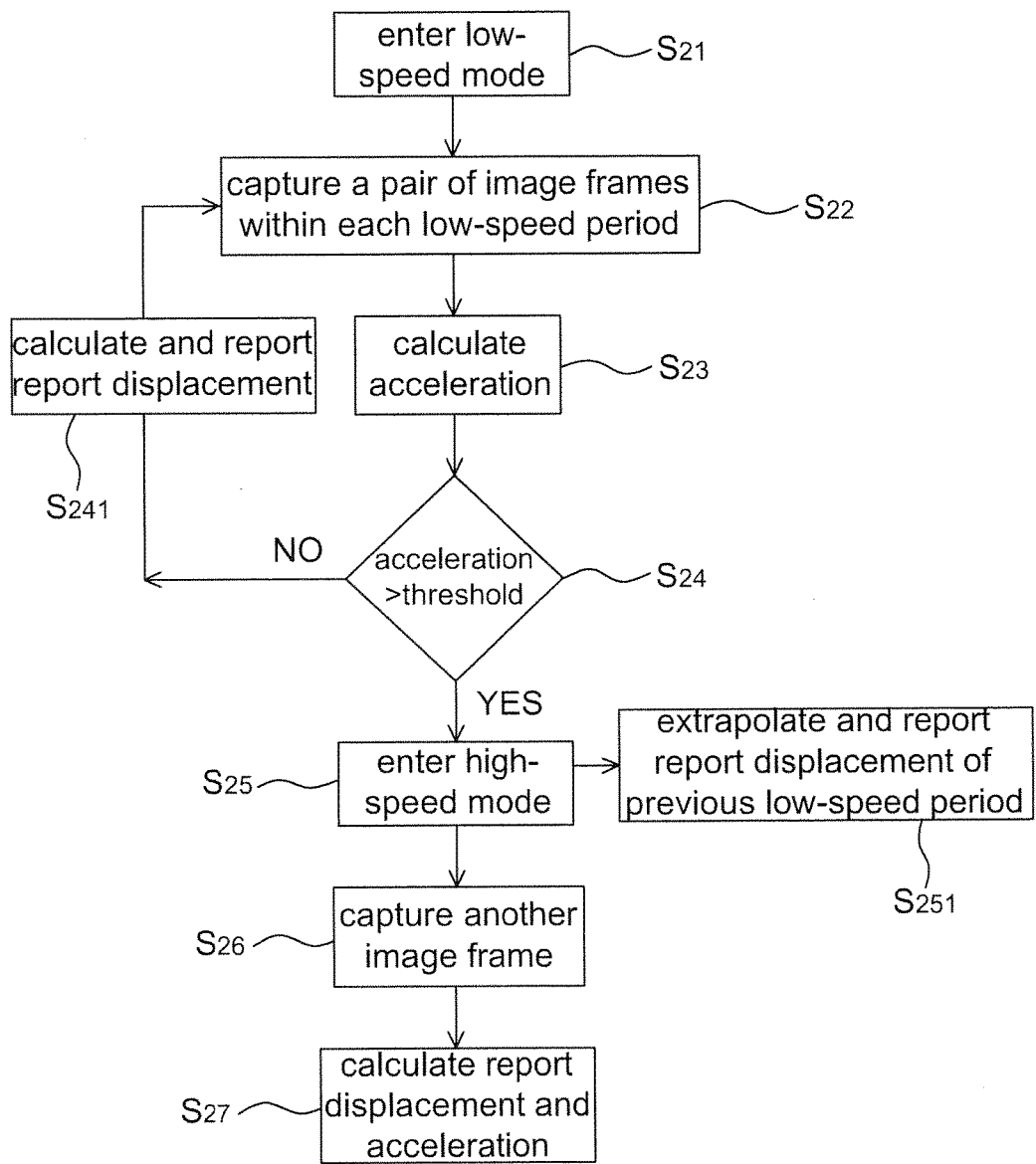
FIG. 5 is a flow chart of the operating method of the navigation device according to one embodiment of the present disclosure.

Referring to FIG. 5, it is a flow chart of the operating method of the navigation device according to one embodiment of the present disclosure including the steps of: entering a low-speed mode (Step $S_{21}$); capturing a pair of image frames within each low-speed period (Step $S_{22}$); calculating acceleration according to the pair of image frames (Step $S_{23}$); comparing the acceleration with at least one threshold (Step $S_{24}$); when the acceleration is smaller than the threshold, maintaining the low-speed mode and calculating report displacement and reporting the report displacement (Step $S_{241}$); when the acceleration exceeds the threshold, entering a high-speed mode (Step $S_{25}$); extrapolating report displacement of a previous low-speed period and reporting the report displacement (Step $S_{251}$); capturing another image frame (Step $S_{26}$); and calculating report displacement and acceleration between two image frames (Step $S_{27}$).

Referring to FIGS. 3-5, the present disclosure is to save power by operating in a low-speed mode and the navigation device 1 firstly entering the low-speed mode (Step $S_{21}$) is taken as an example for illustration. In the low-speed mode, the image sensor 13 captures a pair of image frames within each low-speed period, e.g. AB or GH (Step $S_{22}$). The processing unit 15, for example, calculates acceleration according to the pair of image frames A and B and a previous pair of image frames to be compared with at least one threshold (Step $S_{23}$-$S_{24}$). When the acceleration obtained according to the pair of image frames A and B and its previous pair of image frames is smaller than the threshold, the low-speed mode is kept and the image sensor 13 further captures another pair of image frames DE within a next low-speed period. The processing unit 15 also calculates report displacement according to the image frames A and D to be reported (Step $S_{241}$) and the Step $S_{22}$-Step $S_{24}$ are repeatedly executed till the low-speed mode is ended.

The processing unit 15, for example, calculates acceleration according to the pair of image frames G and H and a previous pair of image frames D and E to be compared with at least one threshold (Step $S_{23}$-$S_{24}$). When the processing unit 15 identifies that the acceleration obtained according to the pair of image frames G and H and the pair of image frames D and E exceeds the threshold, the high-speed mode is entered (Step $S_{25}$). In the high-speed mode, the processing unit 15 calculates displacement according to the pair of image frames G and H and extrapolates the report displacement of a previous low-speed period accordingly, e.g. $D_{DG}$ or $D_{DH}$, as shown in FIG. 4, and the extrapolated displacement $D_{DH}$ is reported (Step $S_{251}$). Then, the processing unit 15 captures another image frame I after another time interval $t_{HI}$ (Step $S_{26}$) and then calculates the displacement and acceleration between the image frames H and I (Step $S_{27}$), wherein the displacement between the image frames H and I is for reporting and the acceleration between the image frames H and I is for determining whether to return to the low-speed mode. As mentioned above, the time interval $t_{HI}$ may or may not be identical to the time interval $t_{GH}$, e.g. being negatively correlated with the calculated acceleration. In some embodiments, said acceleration threshold is previously stored in the navigation device 1, e.g. in a storing unit.

In addition, in other embodiments, the navigation device 1 enters the high-speed mode at first and the low-speed mode is entered when the calculated acceleration in the high-speed mode is smaller than the acceleration threshold. Then in the low-speed mode, the processing unit 15 operates according to the method shown in FIG. 5.

In the navigation device according to some embodiments of the present disclosure, in the low-speed mode a first of the pair of image frames captured within each low-speed period is used to calculate both the acceleration and report displacement, and a second of the pair of image frames is used to calculate the acceleration but not used to calculate the report displacement. In the high speed mode, the processing unit calculates acceleration and displacement according to adjacent two image frames, wherein the displacement is to be reported and the acceleration is used to identify whether to return to the low-speed mode. In addition, the acceleration threshold from the low-speed mode to high-speed mode may be identical or different from the acceleration threshold from the high-speed mode to low-speed mode.

As mentioned above, the conventional optical mouse captures image frames with a fixed high frame rate in order to avoid errors in calculating displacement. However, as the frame rate is maintained at a high value, the power saving effect cannot be efficiently increased. Therefore, the present disclosure further provides a navigation device (FIGS. 2A-2B) and frame rate adjusting method thereof (FIG. 5) that capture a pair of image frames at a lower frame rate in a low-speed mode and the frame rate is adaptively increased when necessary so as to improve the power saving effect in the low-speed mode and to maintain the acceleration performance in a high-speed mode.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device adapted to be operated on a work surface, the navigation device comprising:
    an image sensor configured to capture reflected light of the work surface with a low-speed period to generate image frames, wherein the image sensor captures only a pair of image frames within each low-speed period; and
    a processing unit configured to
        calculate a first velocity according to a first pair of image frames of the low-speed period and calculate a second velocity according to a second pair of image frames of a next low-speed period,
        calculate acceleration according to the first velocity and the second velocity, and
        identify whether to adjust the low-speed period to a high-speed period, which is a time interval between capturing two image frames, only according to a comparison between the calculated acceleration and an acceleration threshold, wherein
    the low-speed period is longer than the high-speed period, and
    within the low-speed period, the image sensor is configured to capture the pair of image frames separated by a first time interval and stop capturing any image frame within a second time interval, wherein the first time interval is equal to the high-speed period, the first time interval is prior to the second time interval, and the second time interval is longer than the first time interval.

2. The navigation device as claimed in claim 1, wherein the processing unit is further configured to calculate report displacement according to a first image frame of the first and second pairs of image frames.

3. The navigation device as claimed in claim 2, wherein a second image frame of the first and second pairs of image frames is not used to calculate the report displacement.

4. The navigation device as claimed in claim 2, wherein the first time interval between the pair of image frames of the low-speed period is negatively correlated with the report displacement.

5. The navigation device as claimed in claim 1, wherein the low-speed period and the high-speed period are configured as report periods.

6. The navigation device as claimed in claim 1, wherein the pair of image frames is successively captured at an initial of the low-speed period.

7. The navigation device as claimed in claim 1, wherein when the calculated acceleration exceeds the acceleration threshold, the processing unit is configured to adjust the low-speed period to the high-speed period, and the high-speed period is negatively correlated with the calculated acceleration.

8. The navigation device as claimed in claim 7, wherein displacement calculated according to first two image frames captured in the high-speed period is used to extrapolate report displacement of a previous low-speed period previous to the high-speed period.

9. A navigation device adapted to be operated on a work surface, the navigation device comprising:
    an image sensor configured to capture reflected light of the work surface with a low-speed period or with at least one high-speed period to generate image frames, wherein the image sensor is configured to capture a first image frame and a second image frame within each low-speed period, wherein
        the low-speed period is longer than the high-speed period, which is a time interval between capturing two image frames, and
        within the low-speed period, the image sensor is configured to capture the first and second image frames separated by a first time interval and stop capturing any image frame within a second time interval, wherein the first time interval is prior to the second time interval, and the second time interval is longer than the first time interval; and
    a processing unit configured to
        calculate a velocity according to the first image frame and the second image frame of a same low-speed period,
        calculate acceleration according to the velocity of two successive low-speed periods,
        determine whether to enter the high-speed period from the low-speed period only according to a comparison between the calculated acceleration and a plurality of acceleration thresholds, and
        calculate report displacement according to the first image frames of different low-speed periods.

10. The navigation device as claimed in claim 9, wherein the first time interval between the first image frame and the second image frame of the low-speed period is negatively correlated with the report displacement.

11. The navigation device as claimed in claim 9, wherein the processing unit is configured to select the high-speed period among a plurality of high-speed periods according to the comparison between the calculated acceleration and the plurality of thresholds, and the selected high-speed period is negatively correlated with the calculated acceleration.

12. The navigation device as claimed in claim 11, wherein the first image frame of a previous low-speed period previous to the selected high-speed period is not used to calculate the report displacement of the previous low-speed period.

13. The navigation device as claimed in claim 9, wherein the low-speed period and the high-speed period are configured as report periods.

14. The navigation device as claimed in claim 9, wherein the first image frame and the second image frame are successively captured at an initial of the low-speed period.

15. A navigation device adapted to be operated on a work surface, the navigation device comprising:
  an image sensor configured to capture reflected light of the work surface to generate image frames; and
  a processing unit configured to
    calculate a first velocity according to a first pair of image frames separated by a time interval and a previous velocity according to a previous pair of image frames captured by the image sensor, and
    calculate acceleration according to the previous velocity and the first velocity, wherein
  when the calculated acceleration exceeds a threshold, the processing unit is configured to control the image sensor to capture another image frame after the time interval,
  when the calculated acceleration is smaller than the threshold, the processing unit is configured to control the image sensor to capture a second pair of image frames separated by the time interval after a pause time, and
  the processing unit is configured to control the image sensor to capture the another image frame after the time interval or the second pair of image frames separated by the time interval after the pause time according to a comparison between the calculated acceleration and the threshold but not according to individual values of the previous and first velocities, wherein
  the time interval and the pause time form a low speed period, and
  within the low-speed period, the image sensor is configured to stop capturing any image frame within the pause time, the time interval is prior to the pause time, and the pause time is longer than the time interval.

16. The navigation device as claimed in claim 15, wherein the processing unit is further configured to calculate report displacement according to a first image frame of the first pair of image frames and a first image frame of the second pair of image frames.

17. The navigation device as claimed in claim 16, wherein the time interval is negatively correlated with the report displacement.

18. The navigation device as claimed in claim 15, wherein when the calculated acceleration exceeds the threshold, the processing unit is further configured to calculate displacement according to the first pair of image frames.

19. The navigation device as claimed in claim 18, wherein the displacement is used to calculate extrapolated displacement of a previous pause time and the time interval of the previous pair of image frames previous to the first pair of image frames.

20. The navigation device as claimed in claim 15, wherein the processing unit is further configured to calculate report displacement according to the another image frame and a second image frame of the first pair of image frames and calculate another acceleration according to the another image frame and the first pair of image frames.

* * * * *